United States Patent
Shimomura et al.

(10) Patent No.: US 7,339,371 B2
(45) Date of Patent: Mar. 4, 2008

(54) ROTATION ANGLE DETECTOR

(75) Inventors: Osamu Shimomura, Okazaki (JP);
Tsutomu Nakamura, Kariya (JP);
Kenji Takeda, Okazaki (JP); Takashi Kawashima, Nagoya (JP); Tatsuya Kitanaka, Nagoya (JP); Koichiro Matsumoto, Kariya (JP); Takao Ban, Toyohashi (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 0 days.

(21) Appl. No.: 11/341,537

(22) Filed: Jan. 30, 2006

(65) Prior Publication Data
US 2006/0170419 A1 Aug. 3, 2006

(30) Foreign Application Priority Data
Feb. 3, 2005 (JP) ............................. 2005-027686
Dec. 15, 2005 (JP) ............................. 2005-361914

(51) Int. Cl.
*G01B 7/30* (2006.01)

(52) U.S. Cl. ............................. 324/207.25; 324/207.2; 324/207.21

(58) Field of Classification Search ........... 324/207.25, 324/207.2, 207.21
See application file for complete search history.

(56) References Cited

U.S. PATENT DOCUMENTS

| 5,889,400 | A   | * | 3/1999  | Nakazawa     | 324/207.2  |
| 6,268,722 | B1  | * | 7/2001  | Kogure et al.| 324/207.25 |
| 6,310,473 | B1  | * | 10/2001 | Zhao         | 324/207.25 |
| 7,009,388 | B2  | * | 3/2006  | Johnson et al.| 324/207.25|
| 2006/0267581 | A1 | * | 11/2006 | Wiese       | 324/207.25 |

FOREIGN PATENT DOCUMENTS

JP    2003-75108    3/2003

OTHER PUBLICATIONS

U.S. Appl. No. 11/168,381, filed Jun. 29, 2005, inventor: Kawashima et al., English Counterpart of JP 2004-231636.

* cited by examiner

*Primary Examiner*—Reena Aurora
(74) *Attorney, Agent, or Firm*—Nixon & Vanderhye PC

(57) ABSTRACT

A rotation angle detector for detecting change in the magnetic flux has a magnetic sensor being disposed at a position in a space between an outer surface of a shaft and a periphery of the magnetic flux generation means. A supplementary magnet is also used in a space that is enclosed in a circular trace of the magnetic sensor around the shaft for even distribution of the magnetic flux generated by the magnetic flux generation means.

4 Claims, 17 Drawing Sheets

ROTATION ANGLE DETECTOR

CROSS REFERENCE TO RELATED APPLICATION

This application is based on and claims the benefit of priority of Japanese Patent Application No. 2005-27686 filed on Feb. 3, 2005, and Japanese Patent Application No. 2005-361914 filed on Dec. 15, 2005, the disclosure of which are incorporated herein by reference.

FIELD OF THE INVENTION

The present invention generally relates to a rotation angle detector.

BACKGROUND OF THE INVENTION

Conventionally, a rotation angle detector detects a rotation angle by using a magnetic detector at a periphery of a rotating magnet (e.g., a permanent magnet, a permanent magnet with a yoke or the like) that generates magnetic flux.

FIGS. 13A and 13B shows a rotation angle detector that includes a shaft 1, a cylindrical magnet 3 attached to the shaft 1, and a magnetic detector 4 disposed at a rotation center of the magnet 3 for detecting magnetic flux generated by the magnet 3. The magnet 3 is an example of a magnetic flux generation means, and the magnetic detector 4 includes two magnetic sensors, that is, a first magnetic sensor 6 and a second magnetic sensor 7 for detecting a wide range of rotation angle. The first and the second magnetic sensors 6, 7 detect the magnetic flux in a plane that is perpendicular to the shaft 1, and the sensors 6, 7 are used for detecting an angle of the magnetic flux at an angular interval of 90 degrees and for outputting a detection signal.

The magnetic sensors 6, 7 in the magnetic detector 4 output the detection signal relative to the magnetic flux in a shape of sine curve and in a shape of cosine curve, and the detection signals are converted by an inverse-trigonometric calculation unit (a microcomputer) to have a linear characteristic of increasing nature in an interval of 180 degrees. The detection signals converted in this manner are connected for a coverage of 360 degrees. This method of rotation angle detection is disclosed in a Japanese Patent Document JP-A-2003-75108, and diagrams shown in FIGS. 3A, 3B and 3C illustrates the sine/cosine curves and converted linear outputs from the detector 4.

However, the magnetic flux generated by the cylindrical magnet 3 is warped around the shaft 1 under the influence of magnetism of the shaft 1 when the rotation angle detector has the magnetic detector 4 displaced away from the rotation center of the cylindrical magnet 3 as shown in FIGS. 14A and 14B. Therefore, the rotation angle cannot be correctly detected when the magnetic flux is warped in a space surrounded by the cylindrical magnet 3.

In an attempt to avoid warpage of the magnetic flux, the rotation angle detector shown in FIGS. 15A and 15B has a magnet having a disk shape.

In this case, the magnetic flux is still being warped at a trace line α in FIG. 16 under the influence of the shaft 1. The warpage of the direction of the magnetic flux is represented by arrows around a point β in FIG. 16. As a result, the detection signals from the sensors 6, 7 having magnetism sensing surfaces aligned with a tangential line and a normal line of the trace line (a circle) α do not have matching amplitude, thereby increasing the amount of detection error G as shown in FIG. 17.

Further, the magnetic flux in a circle γ forms an open magnetic field at a proximity of the trace line α of the magnetic detector 4 as shown in FIG. 18. That is, the direction of the magnetic flux is not uniformly aligned to a certain direction, thereby increasing errors in the detection signal caused by a small displacement of the magnetic sensors or the like. As a result, a nominal assembly displacement of the first or second sensors 6, 7 suffers from an increased amount of warpage in the magnetic flux as the error in the detection signal.

SUMMARY OF THE INVENTION

In view of the above-described and other problems, the present invention provides a rotation angle detector that detects the rotation angle even when a magnetic sensor is disposed around a shaft that is formed with magnetic material.

A rotation angle detector for detecting change in the magnetic flux by the magnetic sensor has the magnetic sensor being disposed at a position in a space between an outer surface of a shaft and a periphery of the magnetic flux generation unit between both ends of the shaft. A supplementary magnet is disposed in a space that is within a circular trace of the magnetic sensor around the shaft for evenly distributing the magnetic flux generated by the magnetic flux generation unit. In this manner, the magnetic sensor can detect the change in the magnetic flux without an influence of the shaft made with the magnetic material, thereby enabling detection of rotation angle of the magnetic flux generation unit relative to the magnetic sensor.

The rotation angle detector includes a first and a second magnetic sensor for detecting the magnetic flux aligned in a perpendicular plane to the shaft. The first sensor and the second sensor are disposed at an angle of 90 degrees. The two sensors are complementary in terms of detecting a wide range of angle.

The magnetic poles in the supplementary magnet are aligned in an opposite direction of the poles in the magnetic flux generation unit. In this manner, vectors of the magnetic flux (intensity and direction of magnetic field represented by the magnetic flux) are evenly distributed. As a result, positional displacement between the magnetic flux generation unit and the magnetic sensor will not affect the accuracy of the magnetic sensor.

Further, the combination of the two magnetic sensors being orthogonally disposed (in an angle of 90 degrees) and the supplementary magnet is effective for preventing the directional change (i.e., warpage) of the magnetic flux around those sensors. Therefore, error in the rotation angle due to the positional displacement is suppressed, and the accuracy of the detected angle is improved.

Furthermore, the arrangement of the magnetic poles in the supplementary magnet in an opposite direction to that of the magnetic flux generation unit contributes to a formation of a boundary area in a repulsion to the magnetic flux of the magnetic flux generation unit. In this manner, vectors of the magnetic flux (intensity and direction of magnetic field represented by the magnetic flux) are evenly distributed. As a result, positional displacement between the magnetic flux generation unit and the magnetic sensor will not deteriorate the accuracy of the magnetic sensor when the magnetic sensor is disposed in an radially-outwardly extending space from the boundary area.

Furthermore, the combination of the two magnetic sensors having the angle of 90 degrees and the supplementary magnet aligned in a same magnetic flux direction is effective for preventing the directional change of the magnetic flux detected by those sensors. Therefore, error in the rotation angle due to the positional displacement between the two sensors is suppressed, and the accuracy of the detected angle is improved.

The magnetic flux generation unit in a cylindrical shape serves for preparing a closed magnetic field in a space between the magnetic flux generation unit and the supplementary magnet. As a result, the vectors of the magnetic flux (intensity and direction of the magnetic field represented by the magnetic flux) are highly accurately standardized for an improved accuracy of the detected angle.

The magnetic flux generation unit takes a shape of a disk that is perpendicularly held by the shaft at a center of rotation.

The two magnetic flux generation units in the disk shape leave room for a placement of the magnetic sensor in an axial direction at the center of the rotation. The magnetic poles in each of the two magnetic flux generation units are aligned in the same direction. In this manner, the magnetic flux between the two magnetic flux generation units forms a closed magnetic field in an area between the periphery of the disk and an outer surface of the supplementary magnet, thereby enabling an accurate detection of the rotation angle.

The magnetic flux generation unit uses a permanent magnet for generating the magnetic flux, and the permanent magnet and the supplementary magnet are integrally formed in one body. In this manner, increase of the cost for an additional part and assembly will be prevented.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. A rotation angle detector of the present invention uses a magnetic flux generation unit for generating magnetic flux in a plane perpendicular to a shaft of the rotation angle detector and a magnetic sensor for detecting change in the magnetic flux. The magnetic flux generation unit and the magnetic sensor rotate relative to each other around the shaft. The magnetic flux generation unit takes a form that generally extends radially outwardly from an outer surface of the shaft of the rotation angle detector made with magnetic material, and the magnetic sensor is disposed in a space between the outer surface of the shaft and periphery of the magnetic flux generation unit between both ends of the shaft. A supplementary magnet is used to uniformly arrange the direction of the magnetic flux generated by the magnetic flux generation unit in a space that is closer to the shaft than the magnetic sensor.

First Embodiment

A first embodiment of the rotation angle detector in the present invention is described with reference to FIGS. 1A to 3.

Figure 1A:
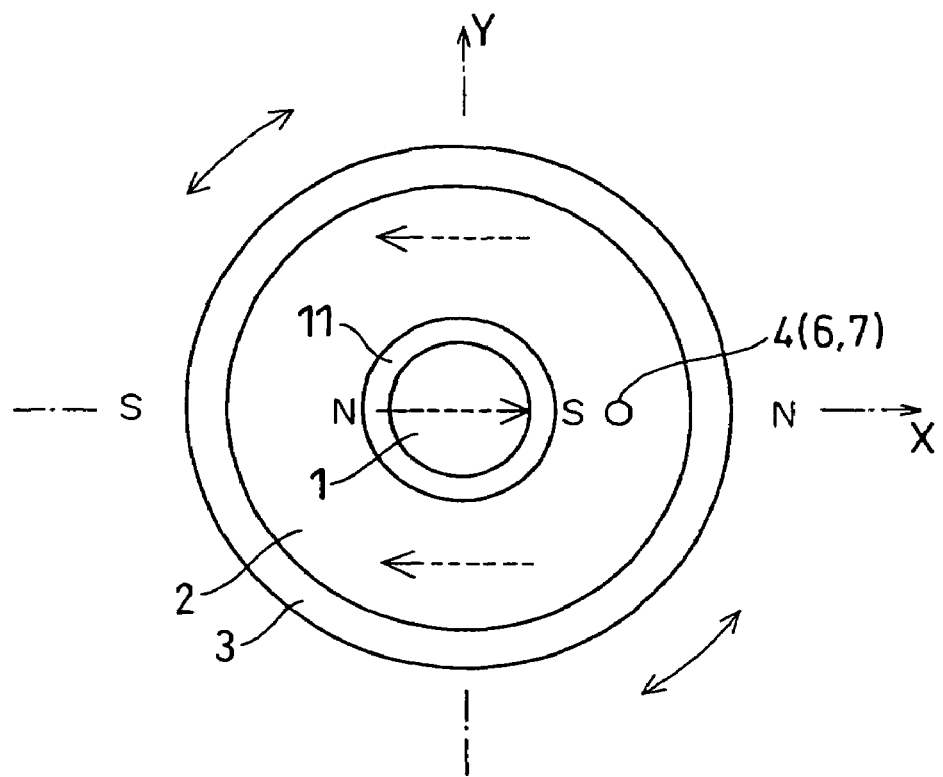
FIG. 1A shows a top view of a rotation angle detector in a fist embodiment of the present invention.
Figure 1B:
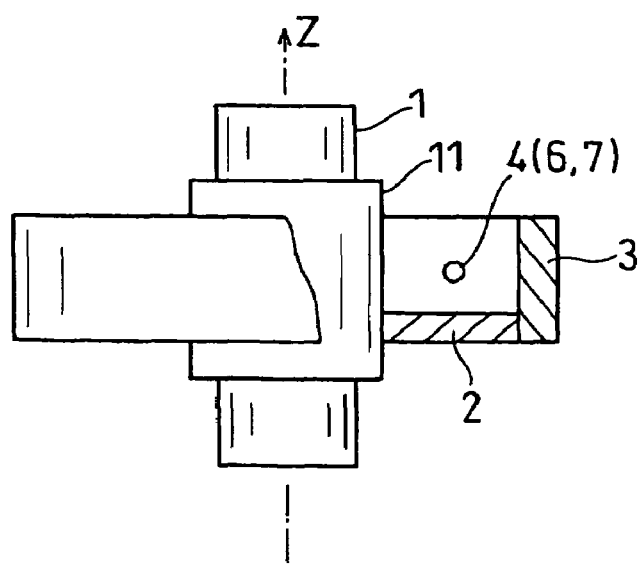
FIG. 1B shows a side view with a partial cross-section of the rotation angle detector in the first embodiment.
Figure 2:
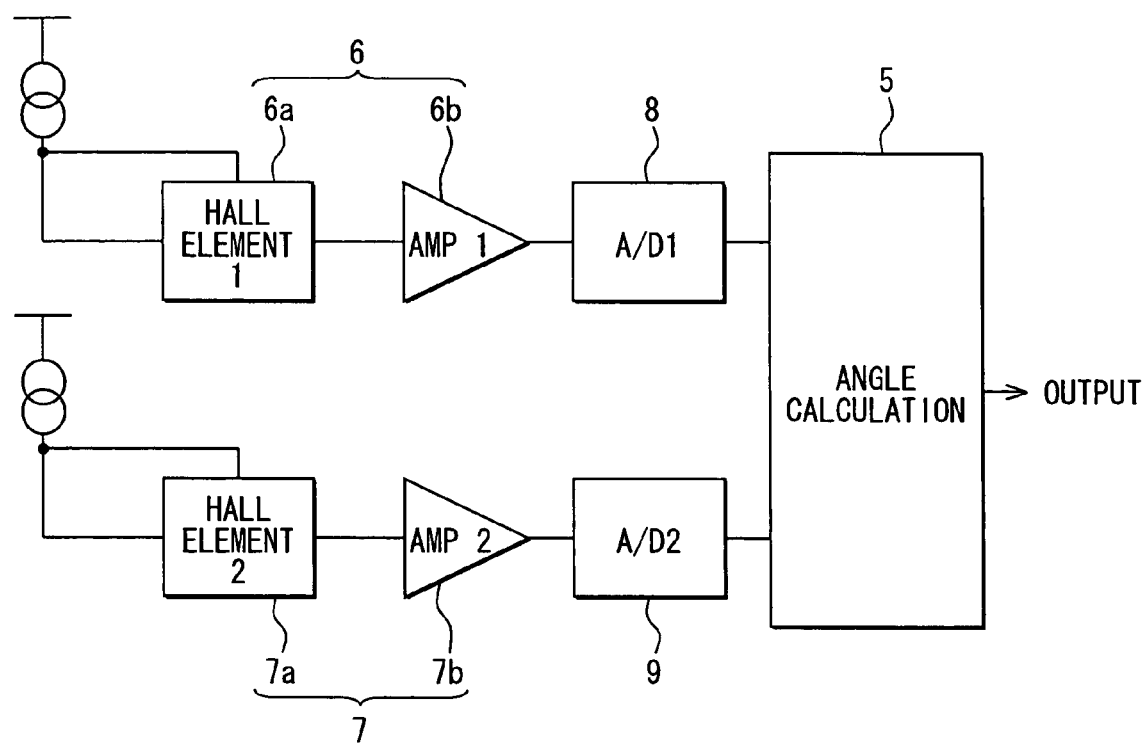
FIG. 2 shows a schematic diagram of an electronic circuit of the rotation angle detector in the first embodiment.

FIGS. 1A, 1B and 2 show a top view, a side view with a partial cross-section and a schematic diagram of an electric circuit of the rotation angle detector.

In the following description, X axis and Y axis are arranged orthogonally to each other in a plane that is perpendicular to the shaft, and Z axis is aligned with the shaft.

The rotation angle detector in the first embodiment includes a shaft 1 (i.e., a rotating member in this embodiment), a cylindrical magnet 3 fixedly disposed on the shaft 1 by using a supporting member 2, and a magnetic detector 4 and an angle calculation unit 5 both disposed on a member (not shown in the drawing) that relatively rotates to the shaft 1 (e.g., a circuit board or the like disposed on, for example, a housing).

The shaft 1 takes a cylindrical form made with the magnetic material (e.g., an iron or the like). The shaft 1 may rotate integrally with, for example, a throttle valve in a throttle opening sensor for detecting a rotation angle.

The supporting member 2 takes a form of a disk made with non-magnetic material such as resin or the like, and is fixedly disposed on the shaft 1 with a supplementary magnet 11 at an inner periphery for radially supporting the cylindrical magnet 3 on the shaft 1 at an outer periphery.

The magnet 3 is a permanent magnet in a cylindrical form with an even thickness, and is fixedly disposed on the shaft 1 with its cylindrical axis aligned with the Z axis (i.e., with the shaft 1) by using the supporting member 2 for integral rotation with the shaft 1. That is, the axis of the magnet coincides with the Z axis.

The magnet 3 generates magnetic flux in a direction that is perpendicular to the Z axis. The direction of the magnetic flux is shown by a broken arrow pointing toward left in FIG. 1A. In this case, the direction is aligned in the direction of the X axis.

The magnetic detector 4 is fixedly disposed in a space surrounded by the magnet 3, and includes a first magnetic sensor 6 and a second magnetic sensor 7 as shown in FIG. 2. The first magnetic sensor 6 and the second magnetic sensor 7 respectively detect magnetic flux in orthogonally different directions, that is, for example, in the directions of the X axis and the Y axis. In this case, the first and the second sensors 6, 7 are implemented in a single piece of a chip.

The first sensor 6 includes a first Hall element 6a for generating an output relative to the direction and the density of the magnetic flux that penetrates a magnetic flux sensing surface on the element 6a. The output from the element 6a is amplified by an amplifier 6b. The amplifier 6b is disposed in the sensor 6 in the present embodiment. The amplifier 6b may be separately disposed from the sensor 6.

The second sensor 7 has a same structure as the first sensor 6. That is, the sensor 7 generates the output relative to the magnetic flux, and includes a second Hall element 7a as well as an amplifier 7b. The amplifier 7b may be integrally disposed in the sensor 7, or may be separately disposed away from the sensor 7.

The magnetic flux sensing surface of the first Hall element 6a is aligned with the X axis and the magnetic flux sensing surface of the second Hall element 7a is aligned with the Y axis in the first embodiment. That is, the first and the second sensor 6, 7 are disposed in a proximity within the periphery of the magnet 3 by using a fixing member.

In this manner, the output from the first sensor 6 and the output from the second sensor 7 respectively correspond to detection of the magnetic flux by orthogonally displaced sensors. That is, the output curve from the sensor 6 takes a form of sine curve A in FIG. 3A, and the output curve from the sensor 7 takes a form of cosine curve B in FIG. 3A.

Figure 3A:
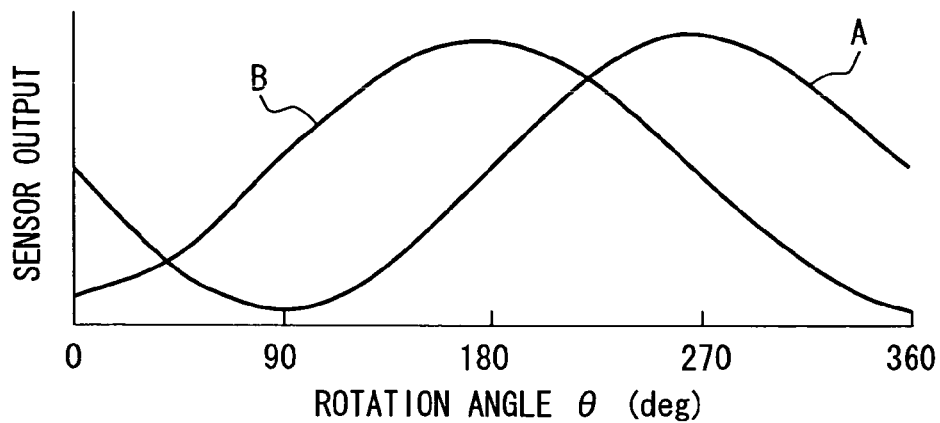
FIG. 3A shows a diagram of an output wave form from sensors in the rotation angle detector in the first embodiment.
Figure 3B:
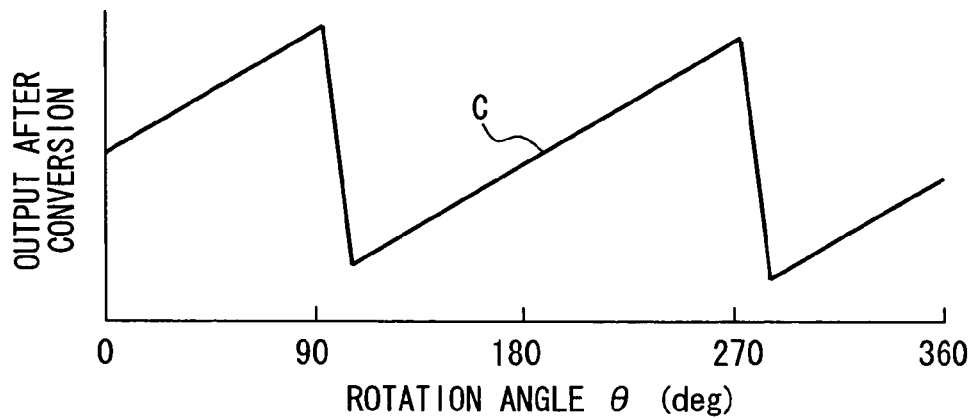
FIG. 3B shows a diagram of an inverse-trigonometric calculation operated on the output from the sensors in the rotation angle detector in the first embodiment.
Figure 3C:
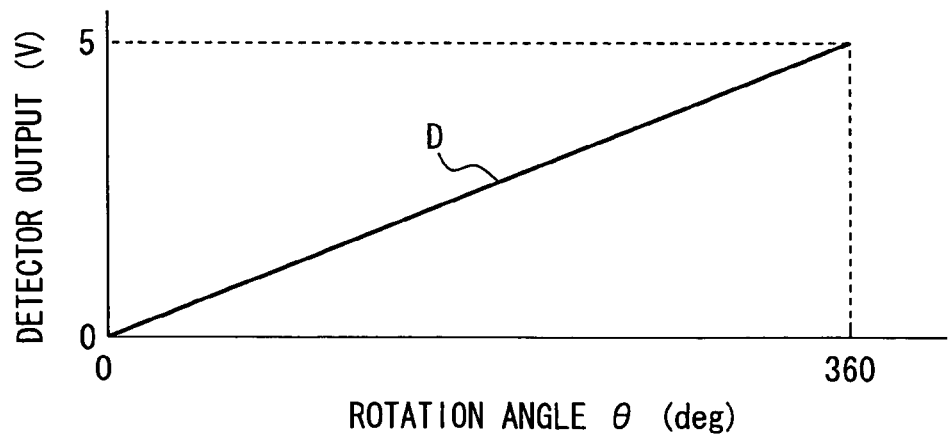
FIG. 3C shows a diagram of linear output from the sensors after connecting operation in the first embodiment.

The angle calculation unit 5 executes angle calculation operation. That is, the calculation unit 5 converts the sine curve A from the first sensor 6 and the cosine curve B from the second sensor 7 to a liner output C in FIG. 3B by an inverse-trigonometric calculation (i.e., $\tan\theta = \sin\theta/\cos\theta$ to $\theta = \tan^{-1}(\sin\theta/\cos\theta)$) at an interval of 180 degrees. The calculation unit 5 further executes a calculation to convert the output C to a linear output D (an analog output) in a range of 360 degrees as shown in FIG. 3C.

The direction of the magnetic flux at the position of the magnetic sensor 4 between the both ends of the shaft 1 is distorted under the influence of the shaft 1 made with the magnetic material. The rotation angle detector in the first embodiment of the present invention uses the supplementary magnet 11 that covers the shaft 1 at a space inside of the magnetic sensor 4. In this manner, the magnetic sensor 4 is positioned between the magnet 3 and the supplementary magnet 11, thereby being prevented from the influence of the shaft 1 that distorts the direction of the magnetic flux, and the distribution of the magnetic flux between these magnets is uniformized.

The supplementary magnet 11 is in a shape of a cylinder having an even thickness around the shaft 1 in a space inwardly from the sensor 4. The axis of the magnet 11 and the axis of the shaft 1 are aligned, and the magnet 11 and the shaft 1 integrally rotate. That is, the magnet 3 and the magnet 11 integrally rotate. Further, the center of the magnet 11 in a plane perpendicular to the Z axis generally coincides with the center of the magnet 3 in the plane perpendicular to the Z axis.

The supplementary magnet 11 in this embodiment has a length that is greater than that of the magnet 3 in the Z axis direction. However, the length of the magnet 11 may be equal to or smaller than the length of the magnet 3 in the Z axis direction.

The supplementary magnet 11 has magnetic poles inversely positioned to those of the magnet 3. That is, an N pole of the supplementary magnet 11 faces an S pole of the magnet 3, and the S pole of the supplementary magnet 11 faces the N pole of the supplementary magnet 11 of the magnet 3 with the magnetic flux aligned with the arrows of the broken line in FIG. 1A.

The magnetic flux is evenly distributed with an accuracy because it is formed in a closed magnetic field between the magnet 3 and the magnet 11. Further, vectors that represent the intensity and the direction of the magnetic field between the two magnets 3 and 11 are uniformly distributed. Therefore, the magnetic sensor 4 is disposed in a space between the magnets 3 and 11 in the first embodiment of the present invention.

The rotation angle detector in the first embodiment can detect the rotation in a range that is greater than 180 degrees by using the two sensor 6 and 7. However, one of the two sensors 6 and 7 may be omitted when the required range of the rotation detection is smaller than 180 degrees.

The first and the second sensors 6 and 7 are disposed in one chip in the first embodiment. However, the two sensors 6 and 7 may be disposed separately in a different chip. Even in that case, the positional displacement of at least one of the two sensors 6 and 7 does not affect the direction of the magnetic flux detected by those sensors, thereby enabling generation of the output having the same amplitude from the two sensors 6 and 7.

Second Embodiment

Figure 4A:
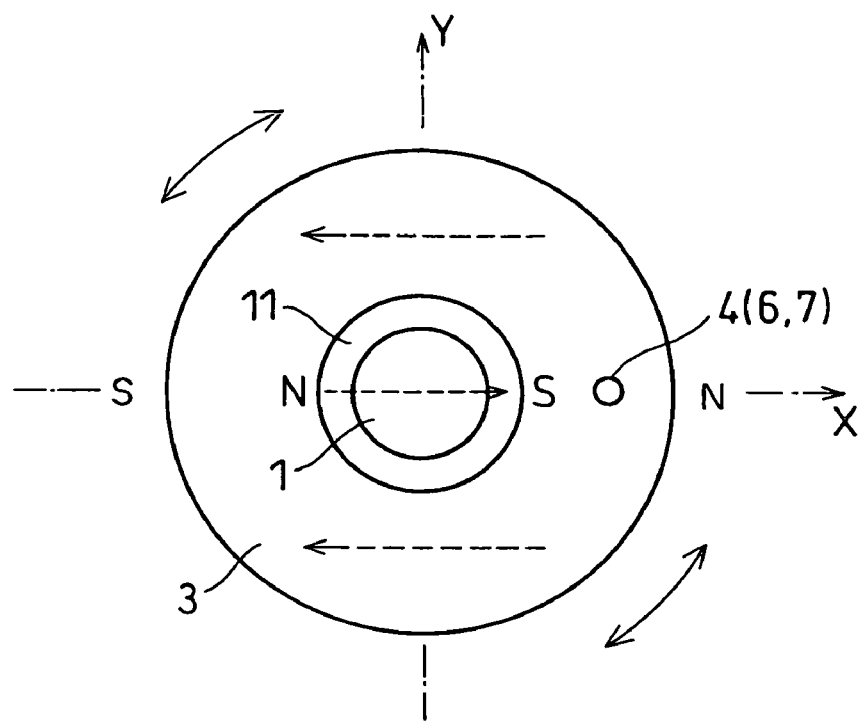
FIG. 4A shows a top view of the rotation angle detector in a second embodiment.
Figure 4B:
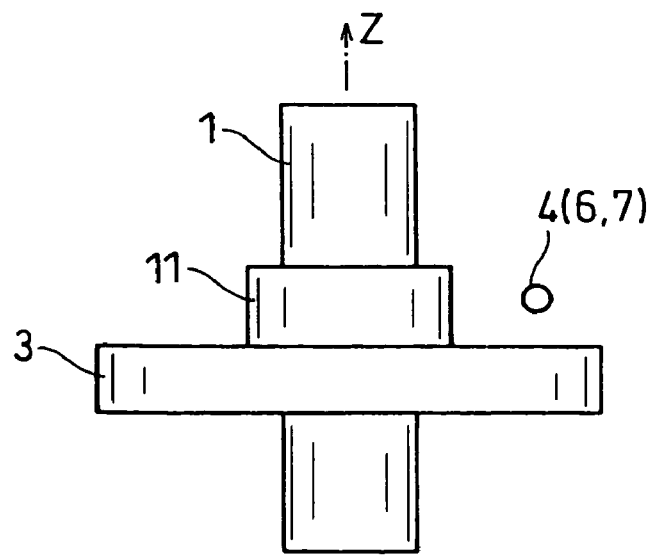
FIG. 4B shows a side view of the rotation angle detector in the second embodiment.

A second embodiment of the present invention is described with reference to FIGS. 4A and 4B. In the second embodiment, like numbers represent like parts as is represented in the first embodiment.

The second embodiment uses the magnet 3 in a disk form instead of the cylindrical form used in the first embodiment. The permanent magnet 3 is in the form of disk with a constant thickness. The center of the magnet 3 coincides with the center (i.e., the Z axis) of the shaft 1, and an inner circumference of the magnet 3 is directly attached on the shaft 1. Therefore, the magnet 3 integrally rotate with the shaft 1.

The magnetic poles in the magnet 3 are aligned with a line that is perpendicular to the Z axis. In the second embodiment, the magnetic flux is aligned with an arrow in a broken line in FIG. 4A with an assistance of the supplementary magnet 11 directly attached to the shaft 1 in an inner space that extends from the magnetic sensor 4 toward the shaft 1. The magnetic flux is formed in a closed magnetic field between the magnets 3 and 11, thereby being prevented from the influence of the shaft 1 made with the magnetic material and being evenly distributed in the space that includes the magnetic sensor 4.

The supplementary magnet 11 is in a form of a cylinder disposed in the space inside of the magnetic sensor 4 with a constant radial thickness. The shaft 1 and the magnet 11 integrally rotate with their center points being coinciding at the same point.

The supplementary magnet 11 has the magnetic poles aligned in the same direction as in the first embodiment. The magnetic flux is evenly distributed in the same manner as described in the first embodiment, because the magnetic field is closed between the magnet 3 and the magnet 11. The magnetic sensor 4 is disposed in the space that outwardly-extending from the outer surface of the magnet 3 toward the periphery of the magnet 11.

The rotation angle detector in the second embodiment can detect the rotation angle even when the position of the magnetic detector 4 is dislocated to a certain extent. This is because the magnetic flux detected by the sensors 6 and 7 is not affected by the change in the positions of those sensors 6 and 7. In this manner, the rotation angle can be detected highly accurately by using the detector of the present invention. At the same time, the output of the sensors 6 and 7 can be maintained in a level of the same intensity for having the same amplitude for the detection of the rotation angle.

The supplementary magnet 11 is integrally formed with the magnet 3, thereby decreasing cost of required parts and assembly. The supplementary magnet 11 may be separately prepared for fixation on the shaft 1.

Third Embodiment

Figure 5A:
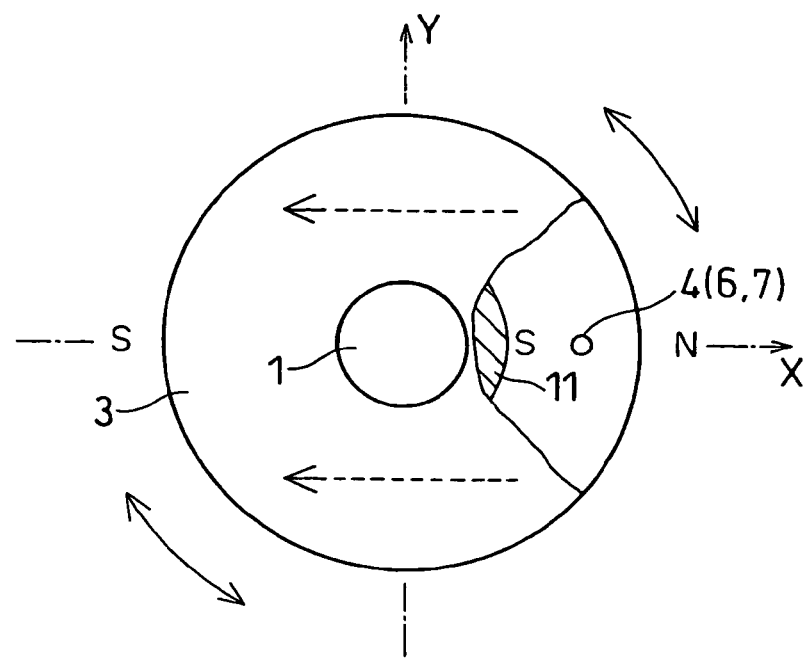
FIG. 5A shows a top view with a partial cross-section of the rotation angle detector in a third embodiment.
Figure 5B:
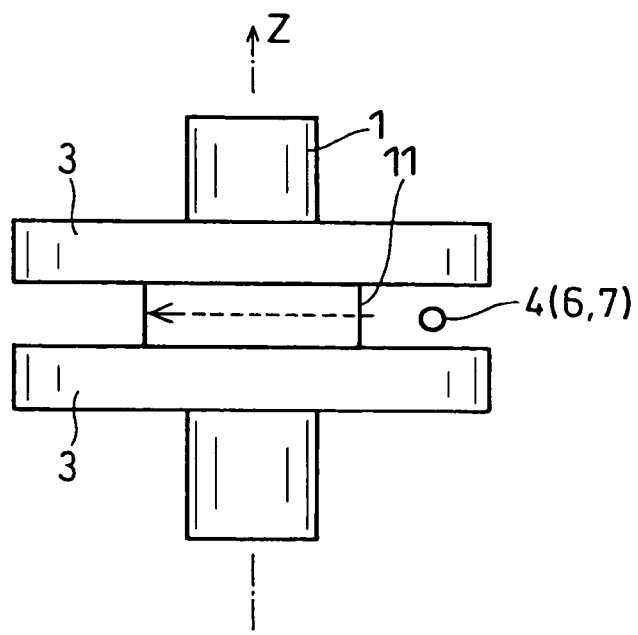
FIG. 5B shows a side view of the rotation angle detector in the third embodiment.

A third embodiment of the present invention is described with reference to FIGS. 5A and 5B. In the third embodiment, like numbers represent like parts as is represented in the first embodiment.

The third embodiment uses two of the magnets 3 in a disk form instead of the cylindrical form used in the first embodiment. Two of the permanent magnet 3 has the same constant thickness and the same magnetic intensity with the same dimensions. The center of the magnets 3 coincide with the center (i.e., the Z axis) of the shaft 1, and an inner circumference of the magnets 3 are directly attached on the shaft 1 having a predetermined amount of space interposed therebetween. The magnets 3 integrally rotate with the shaft 1 made with the magnetic material.

The supplementary magnet 11 is in a form of a cylinder disposed in the space inside of the magnetic sensor 4 having a constant radial thickness. The shaft 1 and the magnet 11 integrally rotate with their center points being coinciding at the same point. The magnetic poles in the magnet 11 are inversely arranged to the arrangement of the poles in the magnet 3.

Due to the structure of the supplementary magnet 11, the magnetic flux is evenly distributed in the same manner as described in the first embodiment, because the magnetic field is closed between the two of the magnets 3 and the magnet 11. The magnetic sensor 4 is disposed in the space that outwardly-extending from the outer surface of the magnet 3 toward the periphery of the magnet 11. Further, vectors that represent the intensity and the direction of the magnetic field between the two of the magnets 3 and the magnet 11 are uniformly distributed at the center of the two of the magnet 3 in the Z axis direction and at the center of the outer surface of the magnet 11 and the periphery of the magnet 3. Therefore, the magnetic sensor 4 is disposed in the space at its center defined by those boundaries.

The rotation angle detector in the third embodiment can detect the rotation angle even when the position of the magnetic detector 4 is dislocated to a certain extent as can the detector described in the second embodiment. This is because the magnetic flux is evenly and densely distributed to a higher extent than the second embodiment. In this manner, the rotation angle can be detected highly accurately by using the detector of the present invention. At the same time, the output of the detector can be increased.

The supplementary magnet 11 is integrally formed with the magnet 3, thereby decreasing cost of required parts and assembly. The supplementary magnet 11 and the magnet 3 may be separately prepared for fixation on the shaft 1.

Fourth Embodiment

A fourth embodiment of the present invention is described with reference to FIGS. 6A to 12B.

Figure 6A:
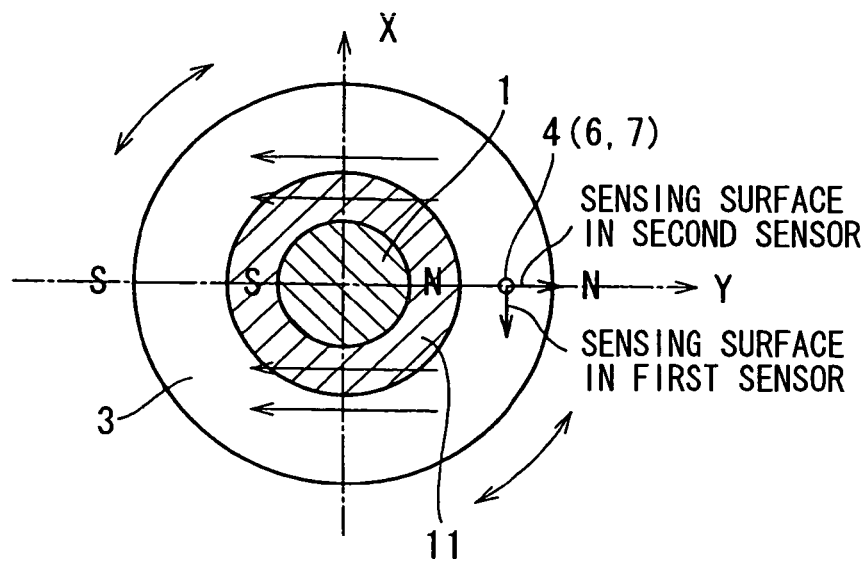
FIG. 6A shows a cross-sectional view of the rotation angle detector along VIA-VIA line in a fourth embodiment.

In the fourth embodiment, the magnetic poles in the supplementary magnet 11 are arranged in the same direction as the poles in the magnet 3 as shown in FIG. 6A.

Figure 9A:
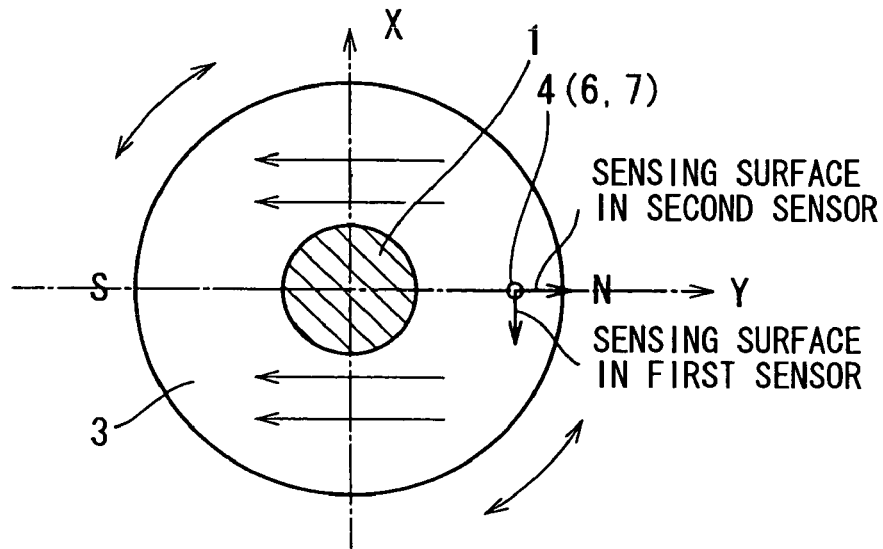
FIG. 9A shows a cross-sectional view of the rotation angle detector along IXA-IXA line in a related art.
Figure 9B:
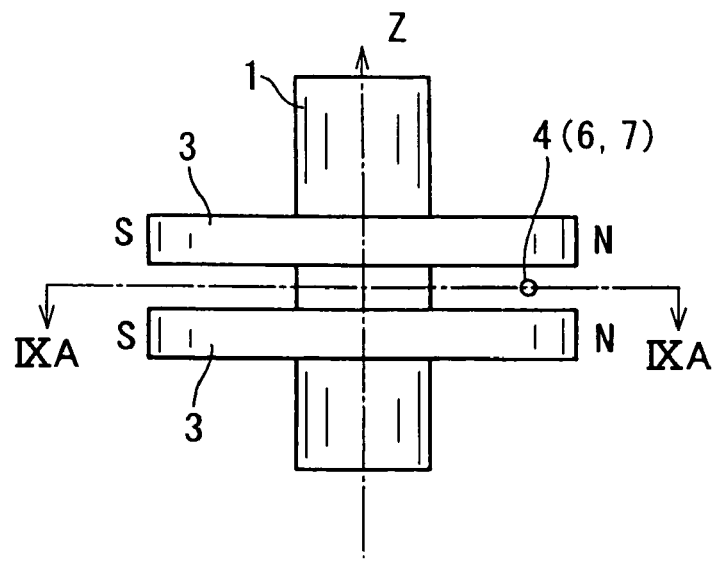
FIG. 9B shows a side view of the rotation angle detector in the related art.

The fourth embodiment of the present invention is described by using a similar art as a basis. The similar art is described with reference to FIGS. 9A to 12B. The similar art, as shown in FIGS. 9A and 9B, takes a form that omits the supplementary magnet 11 in the third embodiment. More practically, the similar art includes two of the magnet rings 3 having the same diameters/thickness/magnetic intensities. The two of the magnet rings 3 are fixedly disposed on the shaft 1 made with the magnetic material with a predetermined space interposed therebetween. The magnetic poles in the two magnetic rings 3 are arranged in the same direction as shown by arrows in FIG. 9A.

In this manner, a closed magnetic field having magnetic vectors aligned to a radial directions is formed between the two magnetic rings 3 in the direction of the Z axis. The magnetic sensor 4 is disposed in the space between the two magnetic rings 3 having the closed magnetic field.

The rotation angle detector described in an above example is intended to have robustness in the space that includes the magnetic sensor 4.

Figure 10:
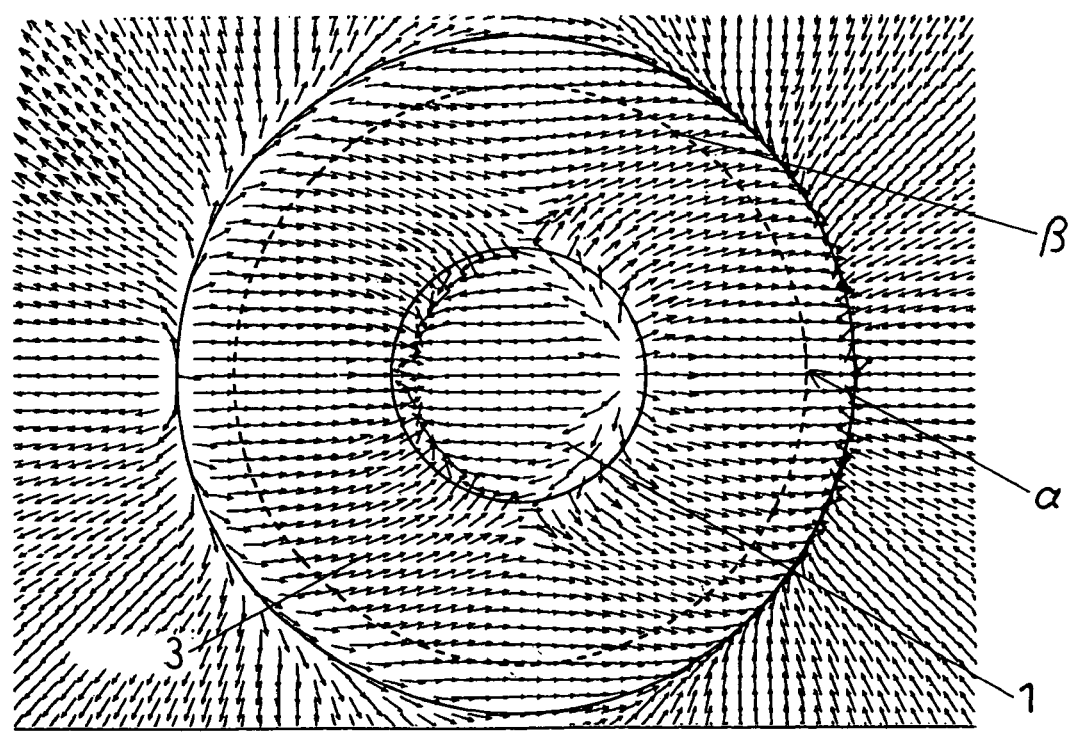
FIG. 10 shows an illustration of the magnetic field in a plane perpendicular to the axis of the rotation angle detector in the related art.
Figure 11A:
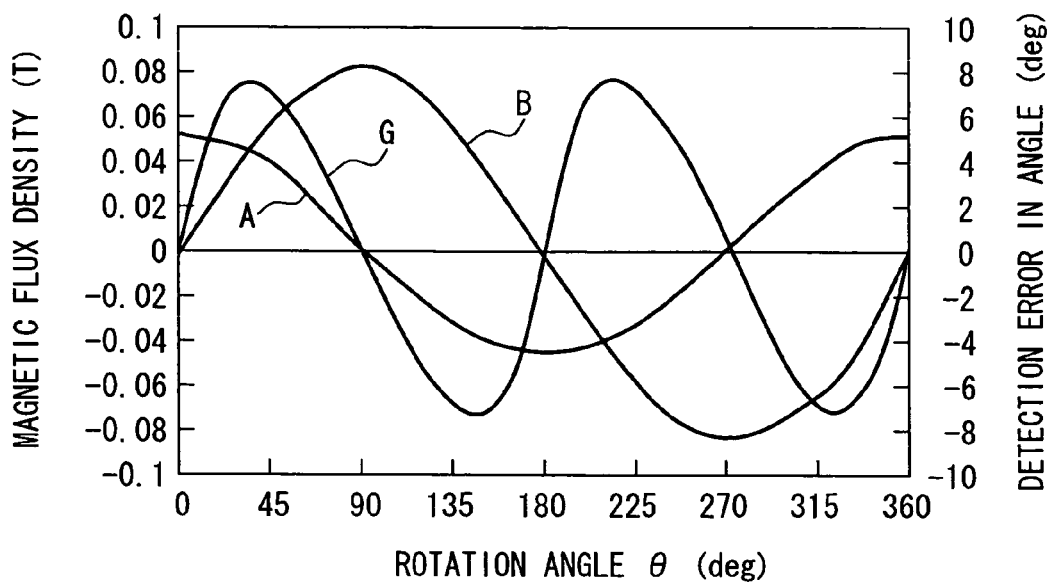
FIG. 11A shows a diagram of the output wave form from sensors with an angular error against a rotation angle in the rotation angle detector in the related art.

However, the magnetic flux in the space between the two magnetic rings is not free from the influence of the shaft 1 as shown in FIG. 10 at a point β on a circular trace α of the magnetic detector 4. As a result, the amplitude of the first and the second sensors 6 and 7 do not match as shown in FIG. 11A. That is, an error G in the rotation angle detection increases.

In this case, (1) an electric correction on the amplitude of the output, and/or (2) precisely tilting a magnetic flux detection surface of the Hall element in one of the sensors 6, 7 are possible solutions for matching the amplitude of the output from the two sensors 6, 7. However, both of these solutions are too complicated for actual implementation.

Further, the influence of the shaft 1 increases detection error G of the rotation angle in the magnetic detector 4 (the first and the second sensors 6, 7) caused by the positional displacement in an assembly or the like. The influence of the shaft 1 is shown in the diagram in FIG. 12A.

Figure 6B:
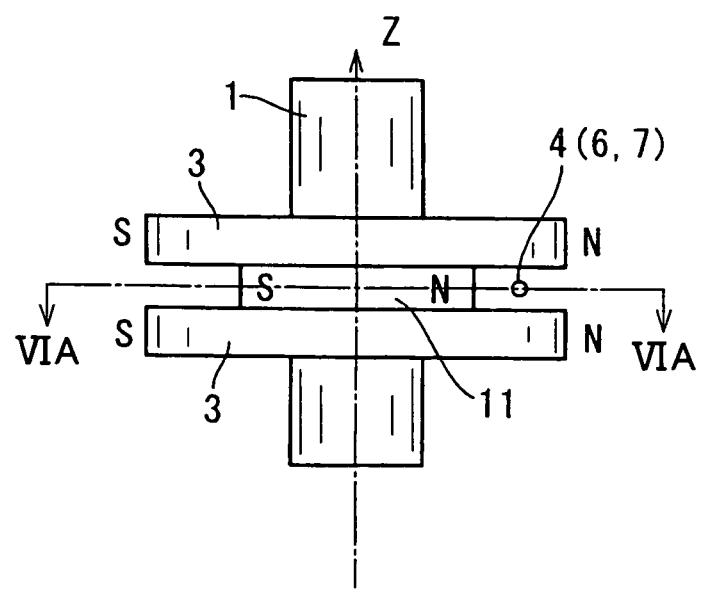
FIG. 6B shows a side view of the rotation angle detector in the fourth embodiment.

In the fourth embodiment, defects of the similar art is worked around by having a similar structure as described in the third embodiment. That is, the rotation angle detector in the fourth embodiment includes two magnetic rings 3 disposed on the shaft 1 with the supplementary magnet 11 interposed therebetween. The difference between the third embodiment and the fourth embodiment exists in the arrangement of the magnetic poles in the two magnetic rings 3 and the supplementary magnet 11. That is, the poles in the magnetic rings 3 and the magnet 11 are arranged in the same direction as shown in FIGS. 6A and 6B.

Figure 7:
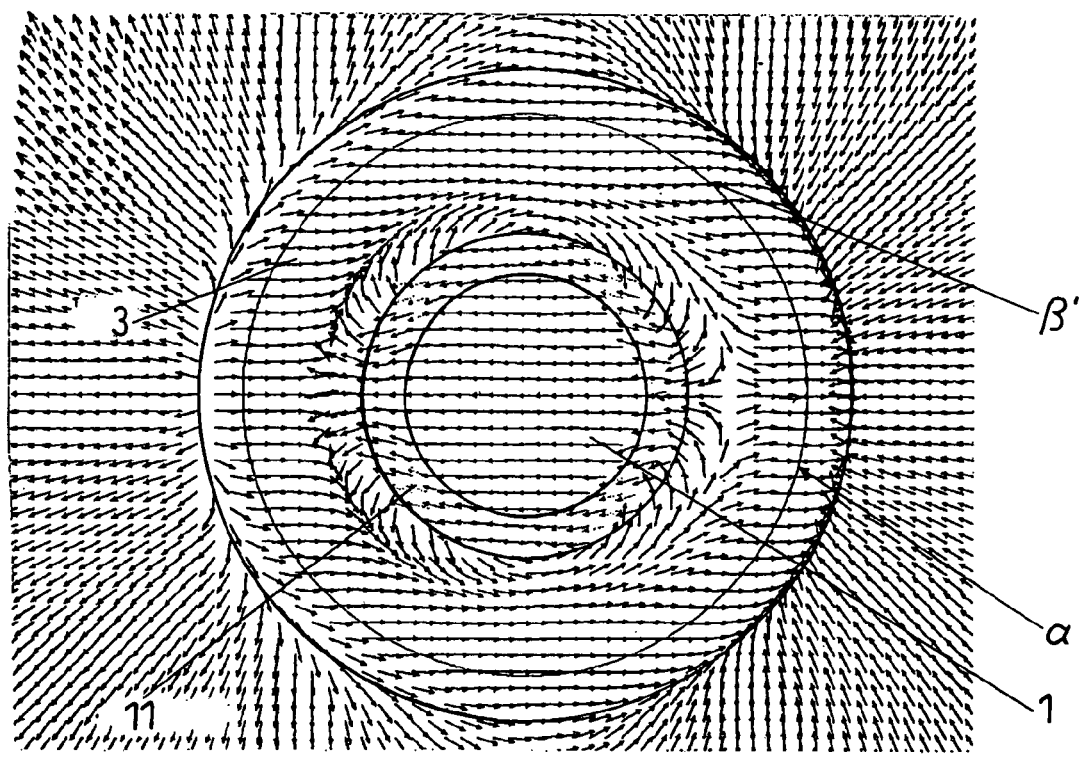
FIG. 7 shows an illustration of a magnetic field in a plane perpendicular to an axis of the rotation angle detector in the fourth embodiment.
Figure 8:
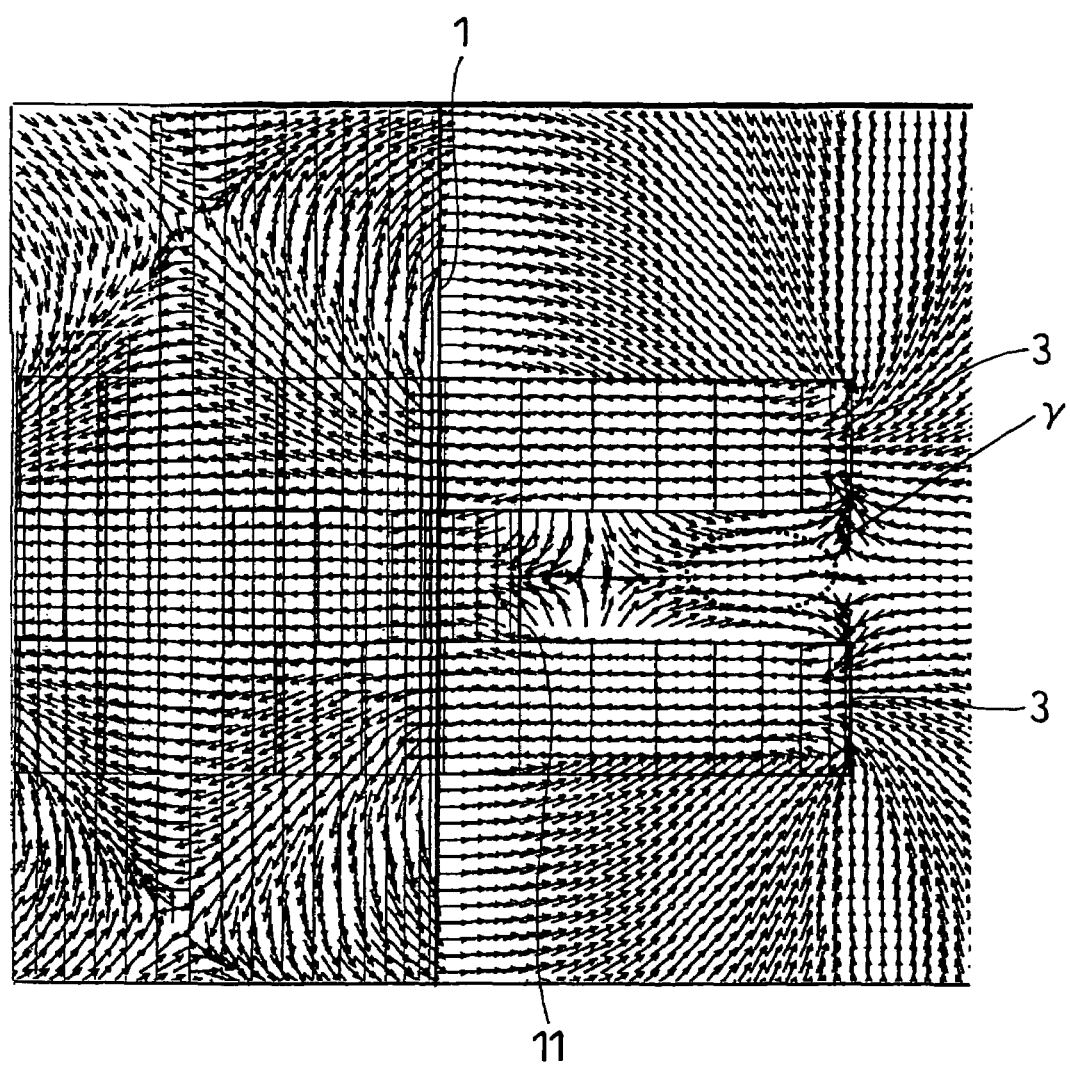
FIG. 8 shows an illustration of the magnetic field in an axial plane of the rotation angle detector in the fourth embodiment.
Figure 11B:
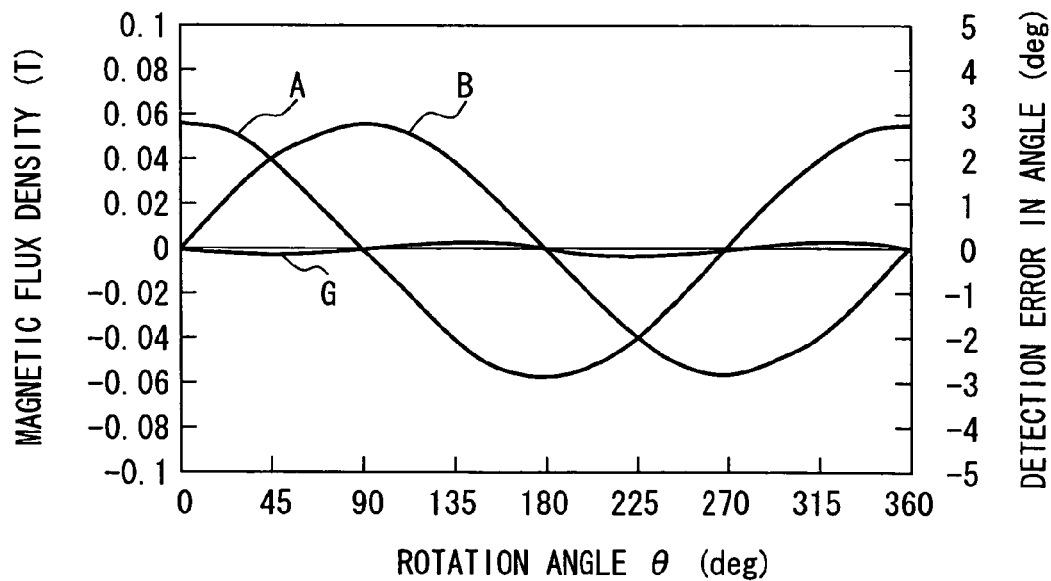
FIG. 11B shows a diagram of the output from sensors with the angular error against the rotation angle in the rotation angle detector in the fourth embodiment.

The arrangement of the magnetic poles in the above-described manner creates an effect that the vectors that represent the directions and the intensities of the magnetic field are made uniform in a space outside of a boundary being repellently created by the magnetic flux from the two magnetic rings 3 as shown in FIGS. 7 and 8. Therefore, the space outside of the boundary is free from the influence of the shaft 1. As a result, the influence of the shaft 1 at the point β in FIG. 10 is removed at a point β' in FIG. 7 due to the use of the supplementary magnet 11, thereby enabling the error G in the rotation angle detection to be nominal as shown in FIG. 11B based on the matching amplitudes of the outputs from the sensors 6 and 7.

Figure 12A:
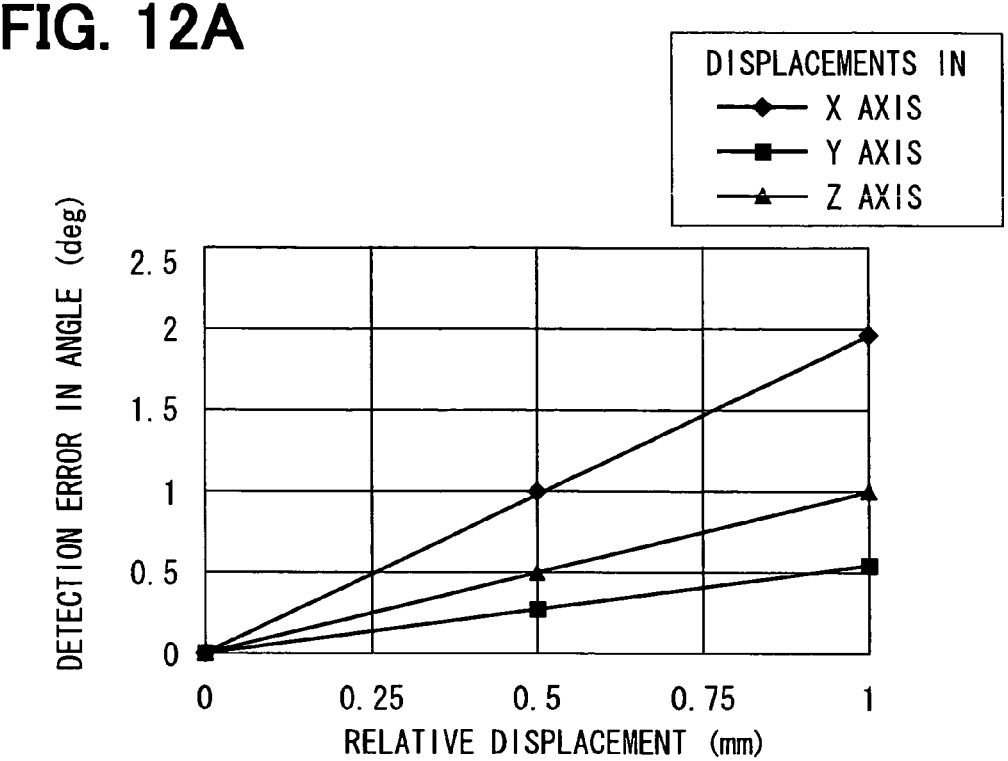
FIG. 12A shows a diagram of the angular error against the relative displacement in x/y/z direction in the related art.
Figure 12B:
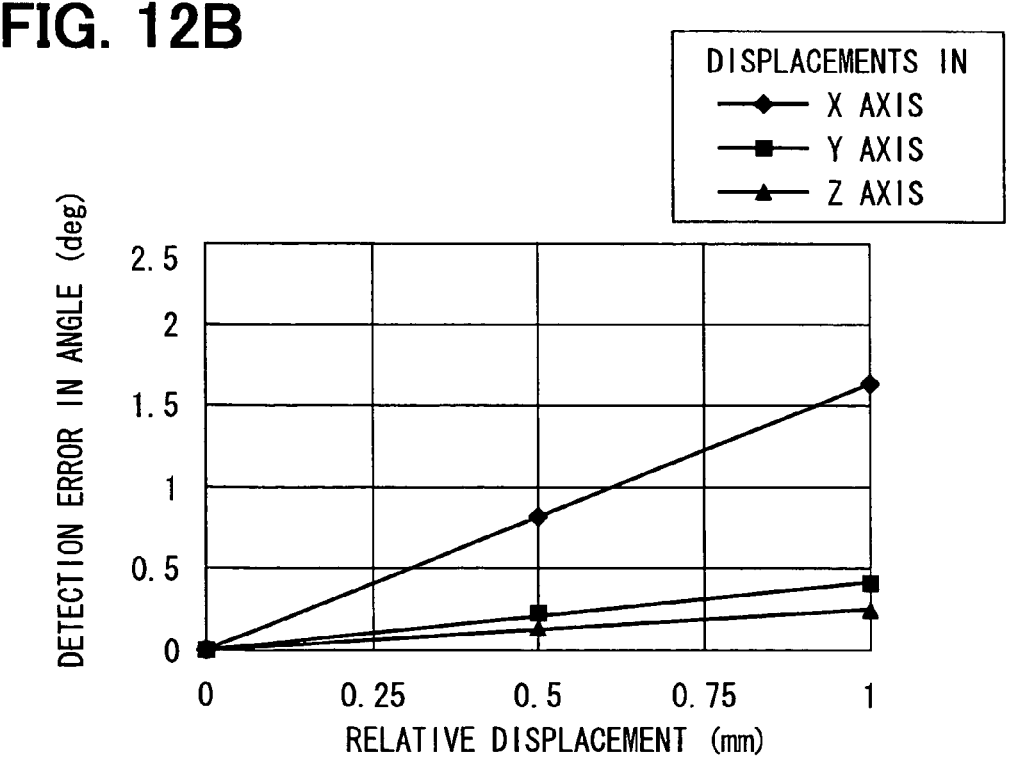
FIG. 12B shows a diagram of the angular error against the relative displacement in x/y/z direction in the fourth embodiment.
Figure 13A:
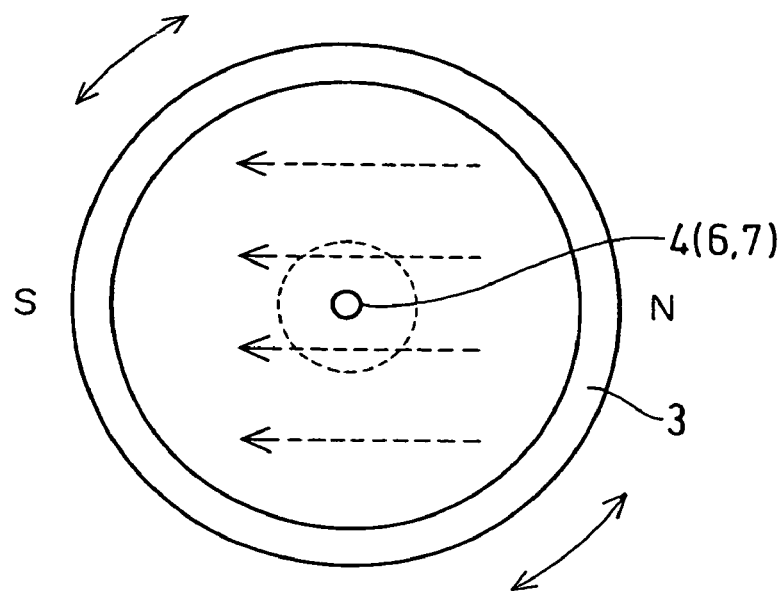
FIG. 13A shows a top view of a rotation angle detector in a fist prior art.
Figure 13B:
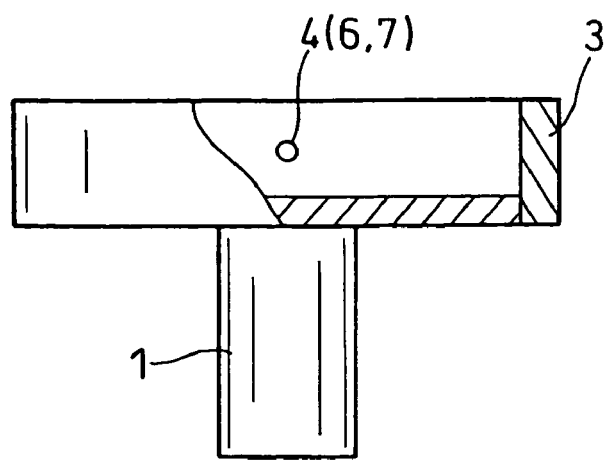
FIG. 13B shows a side view with a partial cross-section of the rotation angle detector in the first prior art.
Figure 14A:
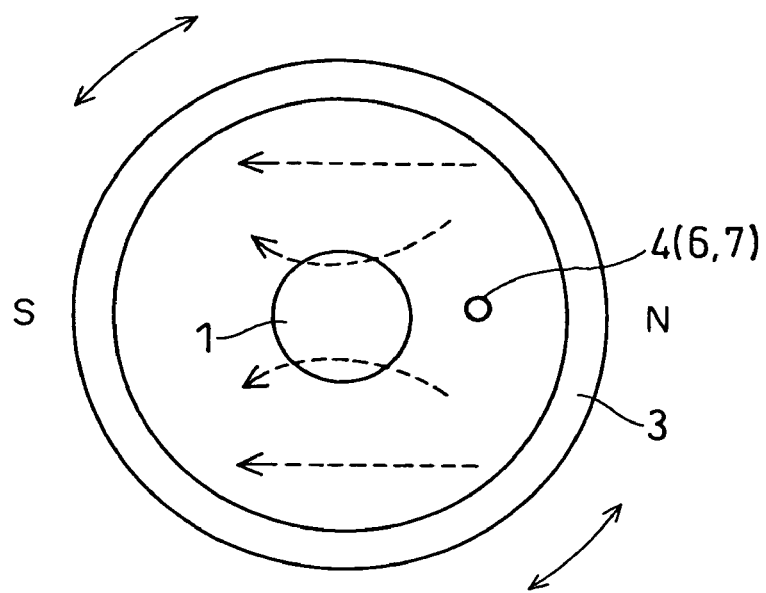
FIG. 14A shows a top view of a rotation angle detector in a second prior art.
Figure 14B:
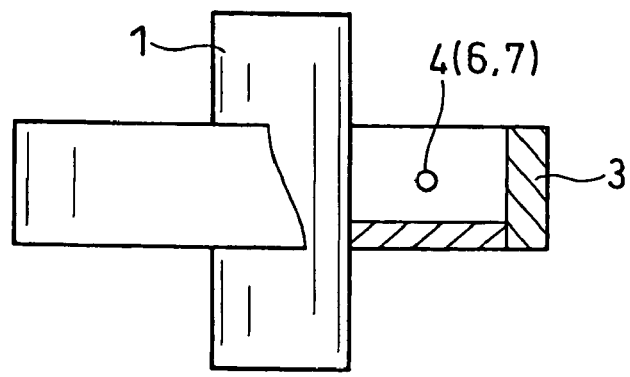
FIG. 14B shows a side view with a partial cross-section of the rotation angle detector in the second prior art.
Figure 15A:
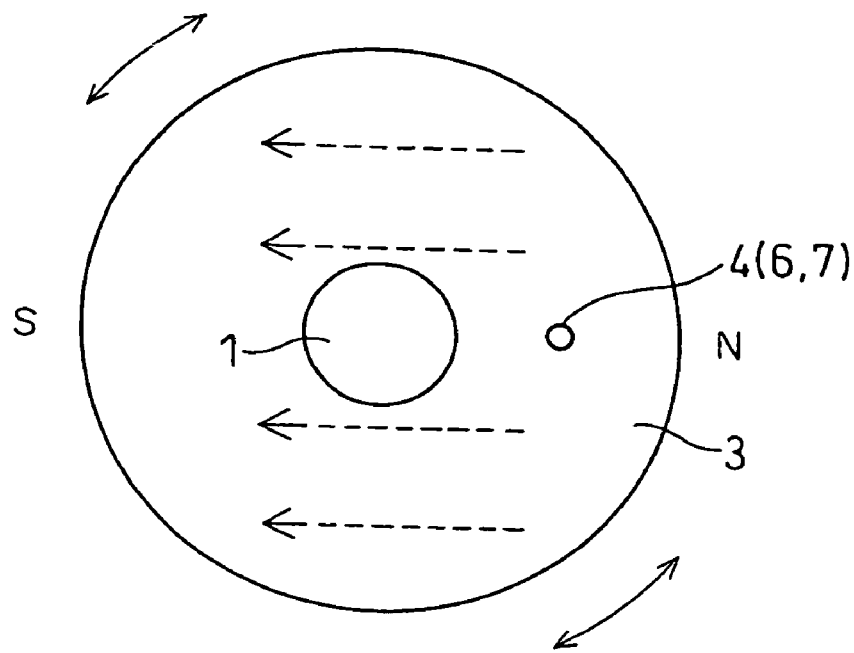
FIG. 15A shows a top view of a rotation angle detector in a third prior art.
Figure 15B:
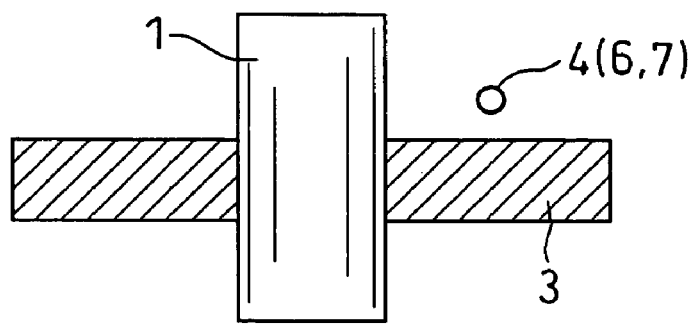
FIG. 15B shows a side view with a partial cross-section of the rotation angle detector in the third prior art.
Figure 16:
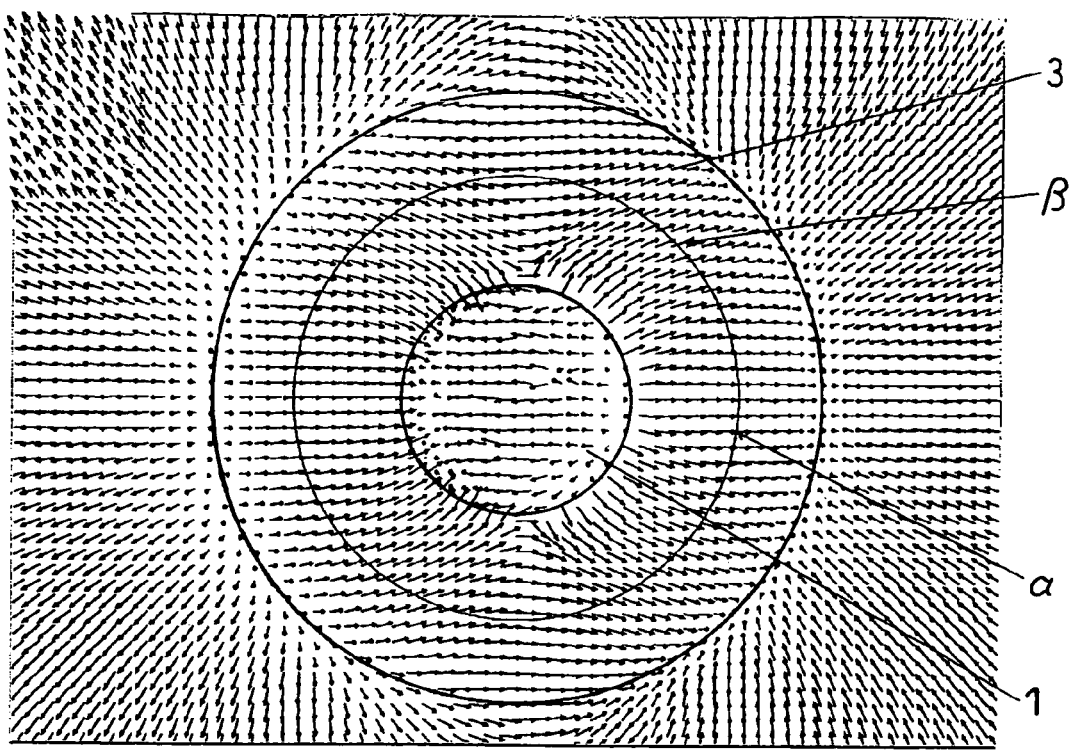
FIG. 16 shows an illustration of the magnetic field in a plane perpendicular to the axis of the rotation angle detector in the third prior art.
Figure 17:
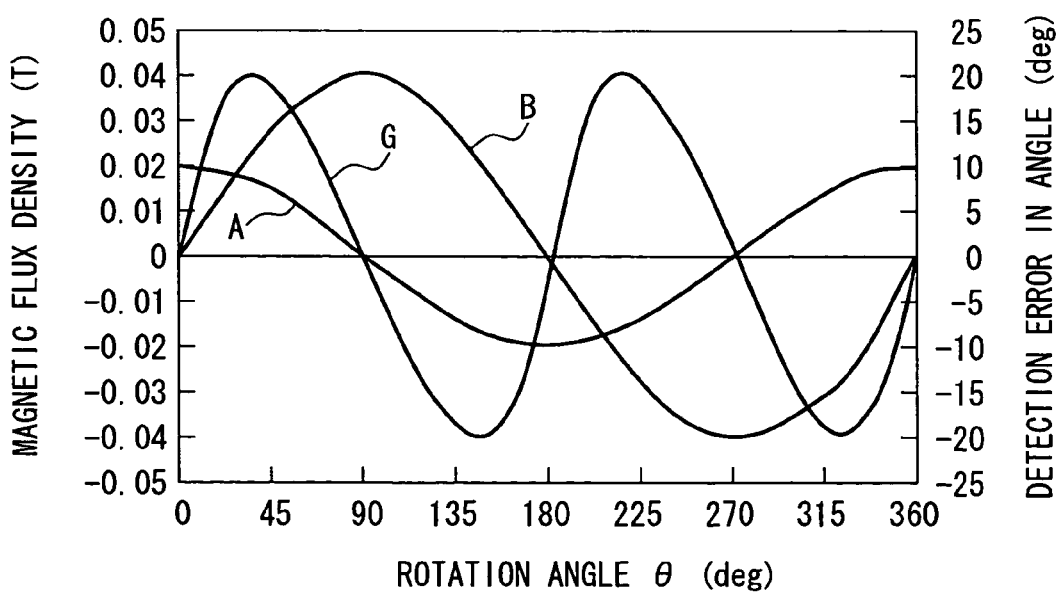
FIG. 17 shows a diagram of the output wave form from the sensors in the rotation angle detector in the third prior art.
Figure 18:
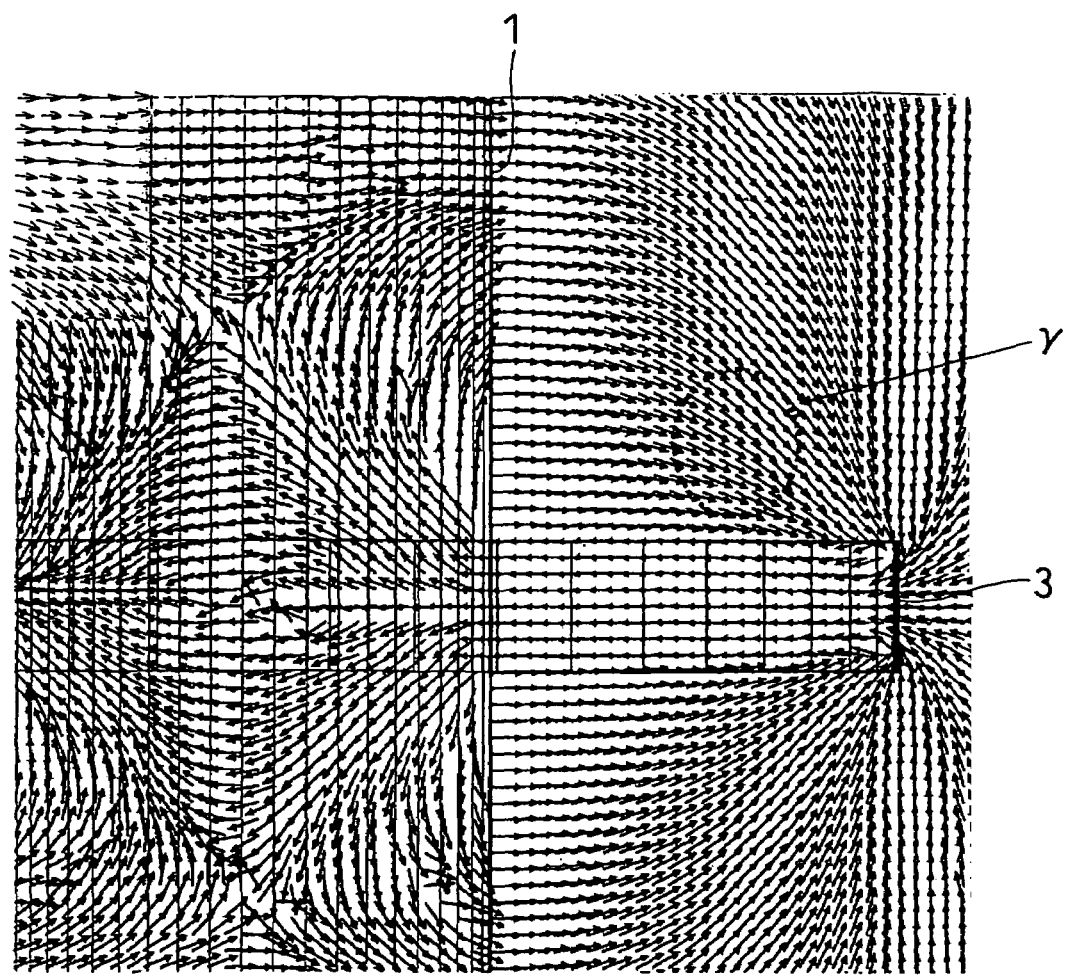
FIG. 18 shows an illustration of the magnetic field in the axial plane of the rotation angle detector in the third prior art.

Further, the removal of the influence of the shaft 1 in a space γ reserved for the magnetic detector 4 as shown in FIG. 8 leads to generation of the matching magnetic vectors, and the errors in the rotation angle detection against the positional displacement in an assembly or the like in the x/y/z directions are reduced to be nominal as shown in FIG. 12B.

Furthermore, the supplementary magnet 11 is integrally formed with the magnets 3, thereby decreasing cost of required parts and assembly. The supplementary magnet 11 may be separately prepared for fixation on the shaft 1.

Furthermore, the first and the second sensors 6, 7 are implemented in one chip as the magnetic detector 4 in the first to fourth embodiments. In this manner, compactness of the sensors 6, 7 is increased as well as reducing the cost of parts.

Furthermore, the first sensor 6 and the second sensor 7 may be disposed in an angular interval of 90 degrees with the magnetic flux sensing surfaces aligned respectively to normal directions (or to tangent directions) in the rotation angle detector to have the same effect.

Although the present invention has been fully described in connection with the preferred embodiment thereof with reference to the accompanying drawings, it is to be noted that various changes and modifications will become apparent to those skilled in the art.

For example, the magnet 3 may be used in combination with a yoke made with the magnetic material in the magnetic flux generation unit.

Further, the magnetic poles in the supplementary magnet 11 may be arranged in a radial direction for fixed disposition of the magnet 11, instead of linear/inversely-linear directions of the magnetic pole arrangement for integral rotation with the magnet 3.

Furthermore, the magnetic detector 4 may be rotated with the magnet 3 in a fixed position, or the magnet 3 and the magnetic detector 4 may be both rotated.

Furthermore, magnetoresistive elements (MRE) or magnetic sensor in other types may be used in place of the Hall elements used as the first and the second sensors 6, 7 in the above embodiments.

Furthermore, the rotation angle detector may be used to detect the rotation angle of a crank shaft, an arm of a robot, or other part of a machine or the like, instead of detecting an opening angle of the throttle valve as described in the above embodiment.

Such changes and modifications are to be understood as being within the scope of the present invention as defined by the appended claims.

What is claimed is:

1. A rotation angle detector comprising:
 a shaft being made with magnetic material;
 a magnetic flux generation means for generating magnetic flux aligned from a first side to a second side in a perpendicular plane to an axis of the shaft;
 a magnetic sensor for sensing change in the magnetic flux; and
 a supplementary magnet, wherein
 the magnetic sensor is disposed in a space that extends radially-outwardly from an outer surface of the shaft and radially-inwardly from a periphery of the magnetic flux generation means between both ends of the shaft,
 the supplementary magnet is disposed in a space that extends radially-inwardly from a trace of the magnetic sensor around the shaft, and
 a rotation angle of the magnetic flux generation means relative to the magnetic sensor is detected by sensing the change in the magnetic flux by the magnetic sensor,
 the magnetic sensor includes a first sensor and a second sensor, and the second sensor is positioned in an angle of approximately 90 degrees relative to the first sensor in terms of a sensing surface for the magnetic flux,
 orientation of a pair of magnetic poles in the supplementary magnet is aligned in a same direction with orientation of a pair of magnetic poles in the magnetic flux generation means, and
 magnetic poles in the supplementary magnet is aligned in a same direction as the magnetic poles in the magnetic flux generation means at an entire circumference.

2. The rotation angle detector according to claim 1, wherein the magnetic flux generation means is in a shape of a cylinder that surrounds the magnetic sensor.

3. A rotation angle detector comprising:
 a shaft being made with magnetic material;
 a magnetic flux generator that generates magnetic flux aligned from a first side to a second side in a perpendicular plane to an axis of the shaft;

a magnetic sensor that senses change in the magnetic flux; and a supplementary magnet, wherein the magnetic sensor is disposed in a space that extends radially-outwardly from an outer surface of the shaft and radially-inwardly from a periphery of the magnetic flux generator between both ends of the shaft, the supplementary magnet is disposed in a space that extends radially-inwardly from a trace of the magnetic sensor around the shaft, a rotation angle of the magnetic flux generator relative to the magnetic sensor is detected by sensing the change in the magnetic flux by the magnetic sensor, the magnetic sensor includes a first sensor and a second sensor, the second sensor is positioned in an angle of approximately 90 degrees relative to the first sensor in terms of a sensing surface for the magnetic flux, orientation of a pair of magnetic poles in the supplementary magnet is aligned in a same direction with orientation of a pair of magnetic poles in the magnetic flux generator, and magnetic poles in the supplementary magnet is aligned in a same direction as the magnetic poles in the magnetic flux generation means at an entire circumference.

4. The rotation angle detector according to claim 3, wherein the magnetic flux generator is in a shape of a cylinder that surrounds the magnetic sensor.

* * * * *